(12) United States Patent
Vogensen et al.

(10) Patent No.: US 6,524,637 B2
(45) Date of Patent: *Feb. 25, 2003

(54) COMPOSITION PROVIDING A STABLE SUSPENSION OF A PARTICULATE COMPONENT

(75) Inventors: Bent Kvist Vogensen, Malling (DK); Hanne Valsted Thygesen, Brabrand (DK); Jørn Borch Søe, Mundelstrup (DK)

(73) Assignee: Danisco A/S, Copenhagen (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,557

(22) Filed: Apr. 9, 1999

(65) Prior Publication Data

US 2002/0034577 A1 Mar. 21, 2002

Related U.S. Application Data

(63) Continuation-in-part of application No. PCT/IB99/00467, filed on Mar. 9, 1999.
(60) Provisional application No. 60/081,251, filed on Apr. 9, 1998.

(30) Foreign Application Priority Data

Mar. 20, 1998 (GB) ............................................. 9805945
Mar. 9, 1999 (WO) ................................ PCT/IB99/00467

(51) Int. Cl.⁷ ........................... A23D 9/00; A23D 9/007
(52) U.S. Cl. .................... 426/601; 426/604; 426/606; 426/611; 426/648; 426/649; 426/650; 426/654
(58) Field of Search ................................ 426/611, 604, 426/606, 648, 649, 654, 601, 33, 99, 98

(56) References Cited

U.S. PATENT DOCUMENTS

| | | | | | |
|---|---|---|---|---|---|
| 2,170,518 A | * | 8/1939 | Muscher | .................... | 426/611 |
| 2,913,342 A | * | 11/1959 | Cameron | .................... | 426/98 |
| 3,295,986 A | * | 1/1967 | Saslaw | .................... | 426/98 |
| 3,698,917 A | * | 10/1972 | Baum | .................... | 426/99 |
| 3,796,814 A | * | 3/1974 | Cermak | .................... | 426/98 |
| 3,895,117 A | * | 7/1975 | Backlund | .................... | 426/648 |
| 3,914,439 A | * | 10/1975 | Graves | .................... | 426/98 |
| 4,016,337 A | * | 4/1977 | Hsu | .................... | 426/99 |
| 4,163,066 A | * | 7/1979 | Mason | .................... | 426/99 |
| 4,275,081 A | * | 6/1981 | Coleman | .................... | 426/33 |
| 4,343,823 A | * | 8/1982 | Todd | .................... | 426/654 |
| 4,385,076 A | * | 5/1983 | Crosby | .................... | 426/649 |
| 4,391,838 A | * | 7/1983 | Pate | .................... | 426/606 |
| 4,698,264 A | * | 10/1987 | Steinke | .................... | 428/402.2 |
| 4,704,288 A | * | 11/1987 | Tsau | .................... | 426/99 |
| 4,707,367 A | * | 11/1987 | Miller | .................... | 426/96 |
| 4,752,485 A | * | 6/1988 | Sharma | .................... | 426/99 |
| 4,786,502 A | * | 11/1988 | Chapura | .................... | 424/441 |
| 4,804,548 A | * | 2/1989 | Sharma | .................... | 426/96 |
| 4,873,194 A | * | 10/1989 | Sawamura | .................... | 426/33 |
| 4,904,485 A | * | 2/1990 | Hirakawa | .................... | 426/98 |
| 5,013,574 A | * | 5/1991 | Hassel | .................... | 426/611 |
| 5,064,669 A | * | 11/1991 | Tan | .................... | 426/307 |
| 5,084,293 A | * | 1/1992 | Todd | .................... | 426/72 |
| 5,094,860 A | * | 3/1992 | Newhall | .................... | 426/78 |
| 5,106,639 A | * | 4/1992 | Lee | .................... | 426/98 |
| 5,114,929 A | * | 5/1992 | Vartan | .................... | 514/29 |
| 5,126,151 A | * | 6/1992 | Bodor | .................... | 426/99 |
| 5,153,013 A | * | 10/1992 | Suyama | .................... | 426/99 |
| 5,185,173 A | * | 2/1993 | Bethker | .................... | 426/601 |
| 5,254,356 A | * | 10/1993 | Busken | .................... | 426/553 |
| 5,314,707 A | * | 5/1994 | Kester | .................... | 426/611 |
| 5,362,512 A | * | 11/1994 | Cabrera | .................... | 426/606 |
| 5,399,371 A | * | 3/1995 | Harris | .................... | 426/611 |
| 5,443,759 A | * | 8/1995 | Dahms | .................... | 252/302 |
| 5,536,519 A | * | 7/1996 | Grab | .................... | 426/98 |
| 5,607,708 A | * | 3/1997 | Fraser | .................... | 426/98 |
| 5,654,029 A | * | 8/1997 | Heeringa | .................... | 426/601 |
| 5,681,601 A | * | 10/1997 | Hendrick | .................... | 426/99 |
| 5,733,594 A | * | 3/1998 | Hirose | .................... | 426/611 |
| 5,895,675 A | * | 4/1999 | Carment | .................... | 426/98 |

FOREIGN PATENT DOCUMENTS

| | | |
|---|---|---|
| DE | 291 240 A5 | 12/1989 |
| EP | 0021 481 | 1/1981 |
| EP | 0021 483 | 1/1981 |
| EP | 0063 835 | 11/1982 |
| EP | 0165 720 | 5/1985 |
| EP | 0421510 | 4/1991 |
| EP | 0572051 * | 1/1993 |
| EP | 0 664 677 | 9/1996 |
| EP | 0 775 444 | 5/1997 |
| GB | 1376870 | 7/1973 |
| GB | 2208079 | 2/1989 |
| JP | 86-084755 | 2/1986 |
| WO | WO 94/08470 | 4/1994 |
| WO | WO 96/13980 | 5/1996 |
| WO | WO 98/47386 | 10/1998 |

* cited by examiner

*Primary Examiner*—Carolyn Paden
(74) *Attorney, Agent, or Firm*—Frommer Lawrence & Haug; Thomas J. Kowalski (57) ABSTRACT

There is provided a composition comprising (a) an oil and/or an oil mimetic component; (b) a triglyceride fatty acid and/or a high melting point emulsifier component; (c) a particulate component; wherein the particulate component (c) is in a stable suspension within a crystal matrix formed by component (b); with the proviso that the particulate component (c) does not form a crystal matrix.

38 Claims, 1 Drawing Sheet

(1 of 1 Drawing Sheet(s) Filed in Color)

COMPOSITION PROVIDING A STABLE SUSPENSION OF A PARTICULATE COMPONENT

RELATED APPLICATIONS

This application is a continuation-in-part of PCT/IB99/00467, filed Mar. 9, 1999, designating the U.S. and claiming priority from British Appln. No. 9805945.4, filed Mar. 20, 1998. This application also claims priority from U.S. Provisional Application Ser. No. 60/081,251, filed Apr. 9, 1998. Each of these applications, as well as the documents cited herein, is incorporated by reference.

BACKGROUND OF THE INVENTION

The present invention relates to a composition. In particular, the present invention relates to a composition for providing a stable suspension of a particulate component.

The preparation or supply of materials in a powder form is problematic. The powder may dust. Dust may be noxious, may have a high or unpleasant odour, settles on surfaces and may require cleaning therefrom. Furthermore, some powders, for example enzymes, may cause allergy. Moreover, powders are difficult to meter/dose in industrial applications, and this difficulty may increase production costs. Powders are often supplied in bags/sacks which require manual opening. Furthermore, because of dosing problems, industrial processes using powders must often be performed in a batchwise manner.

Thus, in many applications, for example the production of foodstuffs, it is desirable to provide a suspension of particulate material, such as functional ingredients, in a dispersant. The suspension may be used in a manufacturing process or may constitute an intermediate or a final product for sale to a consumer.

EP-A-0572051 relates to a liquid bread improver. The bread improver comprises a vegetable oil having a solid fat content of less than 2.0, a hydrogenated vegetable oil which is solid at room temperature, a partly hydrogenated vegetable oil which is solid at room temperature, emulsifieris including at least some diacetyl tartaric esters, and enzymes. The crystal size of the fat present in the composition is less than 25 µm. In this prior art application, the average particle size of the particles present in the composition is always less than 50 µm.

WO-A-94/08470 relates to a salad dressing. The document discusses the problems of phase separation of the oil and water phases of the dressing. This prior art document teaches that a high melting fat which may be added to the oil is thought to form a fragile agglomerate of fine crystals in which aqueous droplets are captured, so that phase separation is prevented.

U.S. Pat. No. 5,185,173 relates to a pumpable bread improver comprising a dispersion of solid particles in a liquid glyceride oil, wherein the solid particles include solid fat particles. The composition comprises greater than 18 wt % solid fat particles. The solid fat particles have a specific density similar to that of the oil and therefore should not rapidly settle to form a sediment. The presence of the fat in particulate form may prevent the sedimentation of the other solid particles.

U.S. Pat. No. 4,889,740 relates to a pourable shortening comprising a liquid glyceride oil and solid fat glyceride particles. The shortening is prepared so that the solid fat particles are substantially in the β crystal form. The shortening may contain solid additives such as emulsifiers. The solid additives will form a crystal matrix or will form part of the structure of the β crystal matrix formed by the solid fat glyceride particles.

The prior art has therefore provided some systems for suspending particulate material in a dispersant.

The present invention addresses the problem of the prior art

The present invention aims to overcome the problems of the prior art.

SUMMARY OF THE INVENTION

Aspects of the present invention are recited in the claims appended hereto.

In a broad aspect the present invention provides a composition comprising (a) a dispersant; (b) a crystal matrix forming component; (c) a particulate component; wherein the particulate component (c) is in a stable suspension within a crystal matrix formed by component (b). In this aspect, preferably the particulate component (c) does not form a crystal matrix.

DESCRIPTION OF THE PREFERRED EMBODIMENTS

The file of this patent contains at least one drawing executed in color. Copies of this patent with color drawing(s) will be provided by the Patent and Trademark Office upon request and payment of the necessary fee.

The present invention is advantageous as it overcomes the problems associated with the prior art.

The term "a crystal matrix formed by component (b)" preferably means that component (b) has a minimum surface area of at least 2 $m^2$ per gram of component (b). The surface area can be calculated in accordance with Protocol C recited after the Examples.

The term "does not form a crystal matrix" preferably means that the particulate component (c) does not form a crystal matrix and/or the structure of the crystal matrix formed by component (b) or a part thereof is not formed from component (c).

The term "stable suspension" preferably means that the composition has a Sedimentation Index (S.I.) in accordance with Protocol A of less than 50%. More preferably, the composition has a S.I. of less than 30%. More preferably, the composition has a S.I. of less than 20%. More preferably, the composition has a S.I. of less than 10%. More preferably, the composition has a S.I. of less than 5%. Protocol A is recited after the examples.

The term "stable suspension" preferably means that the composition has a Separation Index (Sp.I.) in accordance with Protocol B of greater than 70%. More preferably, the composition has a. Sp.I. of greater than 80%. More preferably, the composition has a Sp.I. of greater than 90%. More preferably, the composition has a Sp.I. of greater than 95%. Protocol B is recited after the examples.

The term "particulate component" preferably means a component which is solid on addition to components (a) and/or (b) and is substantially insoluble in components (a) and/or (b).

The term "substantially insoluble" preferably means after a period of 1 day (preferably at a temperature of 20° C.) after the addition of component (c) to components (a) and/or (b) at least 50% by weight based on the weight of component (c) is in the solid phase. More preferably, the term means after a period of 1 day (preferably at a temperature of 20° C.) after the addition of component (c) to components (a) and/or (b) at least 60% by weight based on the weight of component (c) is in the solid phase. More preferably, the term means after a period of 1 day (preferably at a temperature of 20° C.) after the addition of component (c) to components (a) and/or (b) at least 80% by weight based on the weight of component (c) is in the solid phase. More preferably, the term means after a period of 1 day (preferably at a temperature of 20° C.) after the addition of component (c) to components (a) and/or (b) at least 90% by weight based on the weight of component (c) is in the solid phase.

The term "triglyceride fatty acid" preferably means a triester of glycerol and a fatty acid. More preferably the triglyceride fatty acid is a triester of glycerol and a C4 to C24 fatty acid. Preferably the triglyceride fatty acid has an iodine value of from 0 to 60.

The term "oil mimetic" preferably means a material and/or compound and/or composition capable of exhibiting oil like properties. Preferably the oil mimetic is a material and/or compound and/or composition which is liquid and/or is pumpable. Preferably the oil mimetic is a liquid which is non-aqueous.

The term "fully hardened fat" preferably means a triglyceride fatty acid having an iodine value of no greater than 2. Preferably, the triglyceride is a triester of glycerol and a fatty acid having a fatty acid chain length of from 4 to 24 carbon atoms.

The term "partially hardened fat" preferably means a triglyceride of a fatty acid having an iodine value of greater than 2. Preferably, the triglyceride is a triglyceride of a fatty acid having a fatty acid chain length of from 4 to 24 carbon atoms.

The term "high melting point emulsifier" preferably means an emulsifier having a dropping point of greater than 40° C. Preferably the high melting point emulsifier has a dropping point of greater than 60° C. Preferably the high melting point emulsifier is an emulsifier having an iodine value of less than 40. Preferably the high melting point emulsifier is an emulsifier having an iodine value of less than 5.

The term "low melting point emulsifier" preferably means an emulsifier having a solid fat index of less than 15 at 25° C.

Preferably, the oil of component (a) is a triglyceride of an edible C4 to C 24 fatty acid. Preferably, the triglyceride is of animal or vegetable origin. Preferably, the triglyceride has an iodine value of from 0 to 210. More preferably, the triglyceride has an iodine value of from 80 to 140. More preferably, the triglyceride has a solid fat content (SFC) of less than 5 at 25° C. More preferably, the triglyceride has a SFC of less than 1 at 25° C.

Preferably, the oil of component (a) is selected from sunflower oil, soya oil, rapeseed oil, corn oil, peanut oil, safflower oil, olive oil, cottonseed oil, palm olein, interesterified oils, derivatives and mixtures thereof.

Preferably, the oil mimetic of component (a) is selected from emulsifiers, paraffins, oil (fat) substitutes, for example Olestra available from Proctor & Gamble, as well as derivatives and mixtures thereof.

Preferably, the oil mimetic of component (a) is an emulsifier.

Preferably, the oil mimetic emulsifier of component (a) is selected from liquid food emulsifiers according to EU Council Directive 78/663/EEC of Jul. 25, 1978, and liquid food emulsifiers according to Food Chemical Codex FCC IV which are liquid and pumpable at 20° C., derivatives and mixtures thereof.

Preferably, the oil mimetic emulsifier of component (a) is selected from E472e: for example PANODAN™ AB 100 (supplied by Danisco Ingredients, Denmark), PANODAN™ TR (supplied by Danisco Ingredients, Denmark), PANODAN™ SD (supplied by Danisco Ingredients, Denmark), E472c: for example GRINDSTED™ CITREM LR 10 (supplied by Danisco Ingredients, Denmark), E472a: for example GRINDSTED™ ACETEM 90-40 (supplied by Danisco Ingredients, Denmark), GRINDSTED™ ACETEM 90-50 (supplied by Danisco Ingredients, Denmark), GRPMSTED™ ACETEM 95 CO (supplied by Danisco Ingredients, Denmark), E471: GRINDSTED™ MONO-DI MOR 50 (supplied by Danisco Ingredients, Denmark), E 494: Sorbitan monooleate, E 493: Sorbitan monolaurate, E 432: Polysorbate 20, E 433: Polysorbate 80, E 322: lecithin, diacetyl tartaric acid esters of mono-diglycerides of fatty acid, monoglycerides of fatty acids, acetic acid esters of mono-diglycerides of fatty acid, citric acid esters of mono-diglycerides of fatty acid, E 472b: lactic acid esters of mono-diglycerides of fatty acids, sodium oleyl-2-lactate, calcium oleyl-2-lactate, polyglycerol esters of non-polymerised fatty acids, polysorbate, sucrose esters of fatty acids, sucroglycerides, mono-diglycerides of fatty acids, emulsifiers containing antioxidants, derivatives and mixtures thereof.

In the present specification, unless otherwise indicated E-numbers refer to the numbers given in EU Council Directive 78/663/EEC of Jul. 25, 1978.

In one aspect of the present invention, component (a) may be an oil mimetic. In this aspect the present invention provides a composition comprising (a) an oil mimetic component; (b) a trig lyceride fatty acid and/or a high melting point emulsifier component; (c) a particulate component; wherein the particulate component (c) is in a stable suspension within a crystal matrix formed by component (b).

In one aspect of the present invention the oil mimetic emulsifier of component (a) is free from one or more diacetyl tartaric esters.

Preferably, the triglyceride fatty acid of component (b) is selected from fully hardened fats, partially hardened fats, derivatives and mixtures thereof.

The triglyceride fatty acid may comprise non hardened palm stearin

Preferably, the fully hardened fat of component (b) is selected from triglycerides of C4 to C24 fatty acids. Preferably, the fully hardened fat of component (b) is selected from triglycerides of edible C4 to C24 fatty acids. Preferably, the fully hardened fat of component (b) is selected from triglycerides of C4 to C24 fatty acids of animal or vegetable origin. Preferably, the fully hardened fat of component (b) has an iodine value of no greater than 2.

Preferably, the fully hardened fat of component (b) is selected from fully hardened fish oil, fully hardened animal oil, fully hardened palm oil, fully hardened high erucic rape seed oil, fully hardened soya oil, fully hardened sun flower oil, fully hardened corn oil, fully hardened peanut oil, fully hardened safflower oil, fully hardened olive oil, fully hardened palm stearin, fully hardened palm olein, derivatives and mixtures thereof.

Preferably, the partially hardened fat of component (b) is selected from partly hardened fish oil, partly hardened animal oil, partly hardened palm oil, partly hardened high erucic rape seed oil, partly hardened soya oil, partly hardened sun flower oil, partly hardened corn oil, partly hardened peanut oil, partly hardened safflower oil, partly hardened olive oil, partly hardened palm stearin, partly hardened palm olein, partly hardened cotton seed oil, derivatives and mixtures thereof.

Preferably, the high melting point emulsifier of component (b) is selected from E470: salts of fatty acids, E471: Mono-diglycerides of fatty acid, E472a: Acetic acid esters of mono-diglycerides of fatty acid, E472b: Lactic acid esters of mono-diglycerides of fatty acid, E472c: Citric acid esters of mono-diglycerides of fatty acid, E472d: Tartaric acid esters of mono-diglycerides of fatty acid, E472e: Mono-and diacetyl tartaric acid esters of mono-diglycerides of fatty acid, E472f: Mixed acetic and tartaric acid esters of mono-diglycerides of fatty acid, E473: Sucrose esters of fatty acid, E474: Sucroglycerides, E475. Polyglycerol esters of non-polymerised fatty acids, E477: Propane 1,2-diol esters of fatty acids, E481: Sodium stearoyl-2-lactate, E482: Calcium stearoyl-2-lactate, E483: Stearyl tartrate, derivative and mixtures thereof.

More preferably, the high melting point emulsifier of component (b) is selected from blends of mono- and triglycerides, blends of mono- and diglycerides, monoglycerides, diglycerides, soap containing monoglycerides, soap containing mono- diglycerides, derivatives and mixtures thereof.

In one aspect of the present invention, component (b) is a high melting point emulsifier. In this aspect, the present invention provides a composition comprising (a) an oil and/or an oil mimetic component; (b) a high melting point emulsifier component; (c) a particulate component; wherein the particulate component (c) is in a stable suspension within a crystal matrix formed by component (b).

Preferably, the particulate component (c) is selected from hydrocolloids, emulsifiers, salts, flavours, reductants, enzymes, proteins, starches, minerals, vitamins, sweeteners, baking powders, acids, yeast, dry yeast, colourings, spices, herbs, gluten, preservatives, antioxidants, fibres, derivatives and mixtures thereof.

In one embodiment, particulate component (c) is optionally coated prior to addition to the composition.

In a particularly preferred embodiment the particulate component (c) comprises and/or is an enzyme.

In one aspect of the present invention the particulate component (c) is free from one or more diacetyl tartaric esters.

For some cases, the particulate component (c) preferably has an average particle size of greater than 25 $\mu$m. More preferably, the particulate component (c) has an average particle size of greater than 50 $\mu$m. The particulate component (c) may have an average particle size of greater than 100 $\mu$m. The particulate component (c) may have an average particle size of greater than 400 $\mu$m. The particulate component (c) may have an average particle size of greater than 600 $\mu$m. The particulate component (c) may have an average particle size of greater than 800 $\mu$m. The particulate component (c) may have an average particle size of greater than 1000 $\mu$m.

The average particle size of the particulate component may be selected and/or controlled depending on, among other things, the specific density of component (c). As the specific density of the particulate component is decreased the size the average particle size of particulate component which may be suspended in a given composition may be increased and vice versa.

The composition of the present invention may further comprise (d) a crystal modifier.

The term "crystal modifier" preferably means a material and/or compound and/or composition which is capable of preventing and/or inhibiting crystallisation of one or more components of the composition; and/or changes in the crystal form of one or more components of the composition which are in a crystalline form.

Without being bound by theory it is believed that the crystal modifier prevents and/or inhibits the conversion of one crystal form of component (b) to another. In a preferred embodiment, it is believed that the crystal modifier prevents and/or inhibits the conversion of component (b) to the $\beta$ crystal form. In a further preferred embodiment, it is believed that the crystal modifier prevents and/or inhibits the conversion of component (b) from the $\beta'$ crystal form to the $\beta$ crystal form.

Preferably, the crystal modifier prevents and/or inhibits the formation of the $\beta$ form of component (b). Preferably, the crystal modifier prevents and/or inhibits the formation of the $\beta$ form of the triglyceride fatty acid.

Preferably, the crystal modifier prevents and/or inhibits the conversion of the $\beta$ form of component (b) to the $\beta$ form thereof. Preferably, the crystal modifier prevents and/or inhibits the conversion of the $\beta'$ form of the triglyceride fatty acid to the $\beta$ form thereof.

Preferably, the crystal matrix of the composition of the present invention is substantially free of component (b) in $\beta$ form. More preferably, crystalline component (b) is substantially in the $\beta'$ form.

Preferably, the crystal modifier is selected from lecithin, sorbitan tristearete, citric acid esters of monoglycerides, acetic acid esters of mono-diglycerides, polyglycerolesters of fatty acids, derivatives and mixtures thereof.

During storage of the composition of the present invention the crystal form of the crystal lattice may change. For example, during-prolonged storage e.g. greater than 2–3 weeks, the crystal form of the lattice may change from $\alpha$ form to $\beta'$ form and then on to the $\beta$ form or may change directly from $\alpha$ form to the $\beta$ form. The change to the $\beta$ form may result in an increase in the viscosity of the composition. This increase in viscosity may be reversed and/or prevented by incorporation on crystal modifier in the composition. It has been found that it is preferable to add lecithin to reduce viscosity.

If the composition of the present invention is in the form of or is contained in a bread improver, preferably the bread improver contains less than 2% by weight or greater than 20% by weight emulsifier based on the weight of the bread improver.

In one embodiment, the composition may comprise substantially no emulsifier.

The term "substantially no emulsifier" preferably means that emulsifier is present in an amount of less than 2% by weight based on the total composition. Preferably, the term means that is present in an amount of less than 1% by weight based on the total composition. More preferably, the term means that is present in an amount of less than 0.1% by weight based on the total composition.

In one aspect of the present invention the composition is free from one or more diacetyl tartaric esters.

In one aspect of the present invention the composition is free from one or more oxidants.

Preferably, component (a) is present in an amount of greater than 40% based on the weight of the composition.

More preferably, component (a) is present in an amount of greater than 60% based on the weight of the composition. More preferably, component (a) is present in an amount of greater than 80% based on the weight of the composition. More preferably, component (a) is present in an amount of greater than 90% based on the weight of the composition. More preferably, component (a) is present in an amount of greater than 95% based on the weight of the composition. More preferably, component (a) is present in an amount of greater than 98% based on the weight of the composition.

Component (a) may be an oil or an oil mimetic. In other words, component (a) may consist essentially of an oil or may consist essentially of an oil mimetic.

Preferably, the oil of component (a) is present in an amount of greater than 20% based on the weight of component (a). More preferably, the oil of component (a) is present in an amount of greater than 30% based on the weight of component (a). More preferably, the oil of component (a) is present in an amount of greater than 40% based on the weight of component (a).

Preferably, the oil mimetic of component (a) is present in an amount of greater than 20% based on the weight of component (a). More preferably, the oil mimetic of component (a) is present in an amount of greater than 30% based on the weight of component (a). More preferably, the oil mimetic of component (a) is present in an amount of greater than 40% based on the weight of component (a).

Preferably, component. (b) is present in an amount of less than 50% based on the weight of the composition. More preferably, component (b) is present in an amount of less than 40% based on the weight of the composition. More preferably, component (b) is present in an amount of less than 20% based on the weight of the composition. More preferably, component (b) is present in an amount of less than 10% based on the weight of the composition. More preferably, component (b) is present in an amount of less than 5% based on the weight of the composition. More preferably, component (b) is present in an amount of less than 2% based on the weight of the composition.

Component (b) may be a fully hardened fat or a partially hardened fat. In other words, component (b) may consist essentially of a fully hardened fat or may consist essentially of a partially hardened fat.

If component (b) is a fully hardened fat, preferably component (b) is present in an amount of less than 20% based on the weight of the composition. More preferably, component (b) is present in an amount of from 0.1 to 8% based on the weight of the composition. More preferably, component (b) is present in an amount of from 0.5 to 2% based on the weight of the composition.

If component (b) is a partially hardened fat, preferably component (b) is present in an amount of less than 50% based on the weight of the composition.

Preferably, the fully hardened fat of component (b) is present in an amount of greater than 20% based on the weight of component (b). More preferably, the fully hardened fat of component (b) is present in an amount of greater than 30% based on the weight of component (b). The fully hardened fat of component (b) may be present in an amount of greater than 40% based on the weight of component (b). The fully hardened fat: of component; (b) may be present in an amount of greater than 50% based on the weight of component (b).

Preferably, the partially hardened fat of component (b) is present in an amount of greater than 20% based on the weight of component (b). More preferably, the partially hardened fat of component (b) is present in an amount of greater than 30% based on the weight of component (b). The partially hardened fat of component (b) may be present in an amount of greater than 40% based on the weight of component (b). The partially hardened fat of component (b) may be present in an amount of greater than 50% based on the weight of component (b).

Preferably, the high melting point emulsifier of component (b) is present in an s amount of greater than 20% based on the weight of component (b). More preferably, the high melting point emulsifier of component (b) is present in an amount of greater than 30% based on the weight of component (b). The high melting point emulsifier of component (b) may be present in an amount of greater than 40% based on the weight of component (b). The high melting point emulsifier of component (b) may be present in an amount of greater than 50% based on the weight of component (b).

Preferably, the particulate component (c) is present in an amount of less than 60% based on the weight of the composition. More preferably, the particulate component (c) is present in an amount of less than 45% based on the weight of the composition. More preferably, the particulate component (c) is present in an amount of less than 30% based on the weight of the composition. More preferably, the particulate component (c) is present in an amount of less than 20% based on the weight of the composition. The particulate component (c) may be present in high concentrations in the composition. For example, the particulate component (c) may be present in an amount of up to 80% based on the weight of the composition.

Preferably, the crystal modifier (d) is present in an amount of less than 10% based on the weight of the composition.

The composition in accordance with the present invention may further comprises one or more additional ingredients which are soluble in the composition, such as antioxidants, flavours, colours, mixtures and derivatives thereof. Generally, component (a) is present in an amount by weight greater than component (b).

The composition of the present invention may comprise water. Component (c) will typically comprise water and on introduction of component (c) in to the composition water will be introduced in to the composition. Preferably, water will be present in less than an amount necessary to form a lasting emulsion.

Preferably, the composition comprises substantially no water.

The term "substantially no water" preferably means that water is present in an amount of less than 10% by weight based on the total composition. More preferably, water is present in an amount of less than 5% by weight based on the total composition. More preferably, water is present in an amount of less than 2% by weight based on the total composition. More preferably, water is present in an amount of less than 1% by weight based on the total composition. Yet more preferably, water is present in an amount of less than 0.1% by weight based on the total composition.

The viscosity of the composition is dependent on, among other things, the extent of the crystal matrix. Moreover, the viscosity may be controlled to provide a composition having a consistency preferably ranging from a freely flowable liquid to a paste.

In one aspect of the present invention, the composition of the present invention is free from one or more diacetyl tartaric esters.

Preferably, a composition in accordance with the present invention may be used to deliver functional ingredients to the food industry or feed industry enzymes, in particular to deliver functional ingredients such as flavours to the baking industry to produce bread and biscuit/crackers enzymes and/or antioxidants to producers of vegetable oil and for baking antioxidants toproducers of vegetable oil enzymes, minerals and/or vitamins to animal feed producers in the production of one or more food stuffs selected from dressings, ketchup, mustard, sauces, mayonnaise, margarine, noodles, fillings, puddings, oil, mousse, ice cream, yoghurt, dairy products, chocolate, crackers, biscuits, bread, cakes including sponge cakes, chewing gum, confectionery, recombined milk, spreads including margarine and low fat spreads, and combinations thereof; or in the production of cosmetics, pharmaceuticals, feedstuffs, and/or dietary supplements for humans and animals including mineral supplements.

As described above, in a preferred embodiment particulate component (c) comprises or is an enzyme. In this preferred aspect component (a) may be an oil mimetic emulsifier. Preferred oil mimetic emulsifiers and application in which they are particularly advantageous are given in Table I below.

TABLE I

| EMULSIFIER | POSSIBLE APPLICATION |
|---|---|
| Lecithin | Chocolate, crackers, biscuits |
| Diacetyl tartaric acid esters of mono-diglycerides of fatty acids | Bread |
| Monoglycerides of fatty acids | Bread, cakes |
| Acetic acid esters of mono-di glycerides of fatty acids | Chewing gum |
| Citric acid ester of mono-diglycerides of fatty acids | Confectionery, crackers, biscuits |
| Sodium oleyl lactylates, Calcium oleyl lactylates | Bread |
| Polyglycerol esters of non-polymerised fatty acids | Cakes |
| Polysorbate | Bread |
| Sucrose esters of fatty acids | Sponge cakes, recombined milk |
| Sucroglycerides | Sponge cakes, recombined milk |
| Mono-diglycerides of fatty acids | Bakery products |
| Emulsifiers containing antioxidants | Mayonnaise |

The composition in accordance with the present invention may be stored at a wide range of temperatures whilst retaining a stable crystal matrix. A typical composition in accordance with the present invention may be stored at temperatures no greater than 35° C. Preferably, a typical composition in accordance with the present invention may be stored at temperatures no greater than 25° C. Preferably, a typical composition in accordance with the present invention may be stored at temperatures of from 5 to 25° C. However, compositions may be formulated which may be stored at temperatures above 35° C.

The properties, in particular the storage properties, of the composition of the present invention may be controlled by controlling the amount and/or melting point of the component (b). For example, if the composition is to be stored at temperature lower than is usual, the amount of component (b) may be reduced and/or a component (b) may be selected having a lower melting point. Conversely, if the composition is to be stored at temperature higher than is usual, the amount of component (b) may be increased and/or a component (b) may be selected having a higher melting point.

Control of the properties of component (b) may be achieved readily by selecting the constituent(s) of the components and/or, if a number of constituents make up component (b), by selecting the ratio of the constituents relative to each other. For example, if component (b) comprises a fully hardened fat and a partially hardened fat, the melting point of the fats and the ratio of the mixture thereof may be selected depending on the likely storage temperature of the composition of the present invention.

A composition in accordance with the present invention may be prepared by combining components (a), (b) and (c). Alternatively, any two of components (a), (b) and (c) or a portion thereof may be combined and then combined with the third component and/or the remaining portion of the precombined component(s). For example, components (a) and (b) may be combined and then combined with component (c). Alternatively, components (b) and (c) may be combined and then combined with component (a). Yet further, components (a) and (c) may be combined and then combined with component (b).

Additional components, such as component (d) may be added at any time.

As mentioned above in a particularly preferred embodiment particulate component (c) comprises or is an enzyme.

Thus, in a preferred aspect the present invention provided a composition comprising (a) an oil and/or an oil mimetic component; (b) a fully hardened fat and/or partially hardened fat and/or a high melting point emulsifier component; (c) an enzyme in particulate form; wherein the enzyme (c) is in a stable suspension within a crystal matrix formed by component (b).

This aspect is particularly advantageous in that it overcomes some specific problems of the prior art.

In this regard enzymes for use in industrial applications, such as the food industry (for example the production of cheese, fruit juice, beer, meat and bread), are mainly produced by fermentation of bacteria, yeast or fungi, and the enzymes produced by the micro-organism are normally isolated from the culture broth by filtration, and might be further concentrated by ultrafiltration.

Traditionally, enzyme preparations were sold as a solution of the active protein in a water solution. However, enzymes in such form: (i) may easily be contaminated and therefore require the addition of preservatives to increase the microbial shelf-life; (ii) have rather limited stability and denature during storage, with increased denaturation at higher temperature;, and (iii) have increased transportation costs because of the presence of water.

The prior art teaches that these stability problems may be addressed by isolating the enzyme from an aqueous solution by alcohol precipitation, and after alcohol evaporation the enzymes were available as fine powder. The development of spray drying techniques also made it possible to prepare enzyme products in powder form by using substances such as starch and maltodextrin as carriers for the enzyme protein.

The processing of enzymes into powder form solved the problems of microbial contamination and shelf-life, and the enzyme denaturation was greatly reduced. Enzymes in powder form are also very convenient for many applications, because they are easy to dose and easy to mix into powder formulations.

Enzymes in powder form (i) may provoke hypersensitivity followed by allergy in people who handle enzymes because enzymes are biologically active substances; (ii) are difficult to handle because of dust problems and exposure to the respiratory system; and (iii) are not readily handled and are difficult to pump.

In this preferred aspect the present invention provides a composition comprising an enzyme which is safe in use as it reduce/avoids the risk of allergy caused by enzyme dust is convenient to handle as it is easy to meter and as it can be pumped can include other components in the composition—thereby providing a single liquid for transportation and/or processing. Thus, the number of components requiring handling may be reduced In a particularly preferred embodiment the composition comprises substantially no water. This preferred embodiment is particularly advantageous because denaturation of the enzyme is reduced and/or prevented because of the absence of water. Moreover, the admission of oxygen is limited. Thus, in this preferred embodiment the addition of preservatives to prevent microbial spoilage is not essential in contrast to aqueous enzyme preparations. This is particularly advantageous in food applications wherein the addition of substances, such as preservatives is to be avoided and, in respect of particular preservative (which are not approved for food use) is prohibited.

A composition in accordance with the present invention may be prepared in any manner which provides a stable suspension.

Typically, at least components (a) and (b) will be combined and then brought to and/or held at a temperature (for example 10–20° C.) which allows for the formation of the crystal matrix. Component (c) will be added whilst the mixture is agitated. However, this order of production is not essential, components (a), (b) and (c) may be combined prior to the formation of a crystal matrix.

The composition of the present invention may be produced based on the principle of the production of liquid margarine or liquid shortening. Components e.g. (a) a liquid oil, (b) a fully hardened fat, and (c) an enzyme, are combined and crystallised in a tube chiller. The fully hardened fat thereby forms a strong crystal network which is still pumpable but strong enough to keep the particulate component (c) suspended in the oil.

A composition in accordance with the present invention may typically be prepared in accordance with the following method.

1. 98–99 wt % liquid oil (comprising soya oil, sunflower oil, rape seed oil and maize oil) and 1–2 wt % fully hardened oil was melted and blended. The blend was tempered to 55–65° C. (min. 50° C.).

2. The blend was cooled in a tube chiller to approx. 10–20° C.

3. The blend was allowed to rest for 2–4 hours, agitating slowly.

4. Cool to 5° C., agitating slowly for approx. 10–15 hours.

5. Up to 60 wt % based on the total composition of a particulate component was added to the blend, while agitating.

Figure 1:
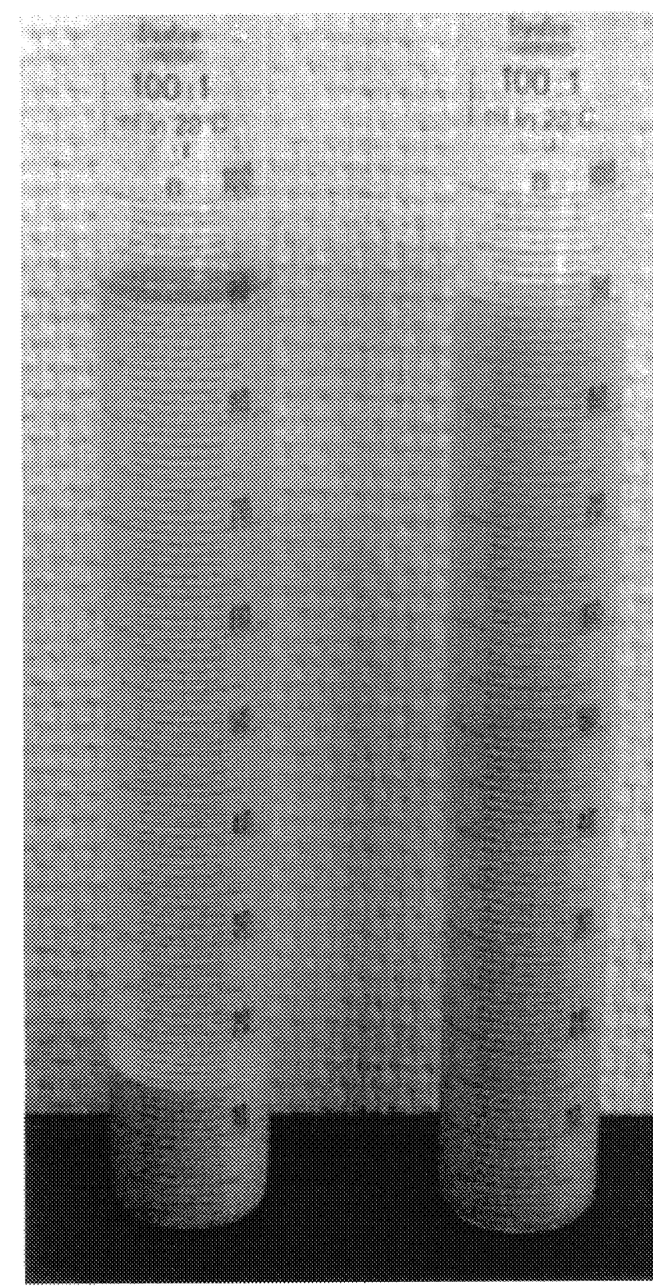
FIG. 1 shows two volumetric cylinders. The cylinder on the left of the photograph contains a composition not in accordance with the present invention. The cylinder on the right of the photograph contains a composition in accordance with the present invention.

The invention will now be described, by way of example only, with reference to the accompanying drawings in which:

FIG. 1 shows a photograph of two compositions.

FIG. 1 shows two volumetric cylinders. The cylinder on the left of the photograph contains a composition not in accordance with the present invention. The cylinder on the right of the photograph contains a composition in accordance with the present invention.

The cylinder on the left contains a composition comprising components (a) and (c) of the definition of the present invention (sample 11-3). The cylinder on the right contains a composition comprising components (a), (b) and (c) in accordance with the present invention (sample 11-2).

Details as to how the compositions were prepared are given in Example 11.

EXAMPLES

As described above the composition of the present invention may be used in a large number of applications. Examples of such uses and of various composition in accordance with the present invention are given in the following examples.

Example 1

Different Dosage of Stabiliser

In this example various concentrations of an stabiliser blend, GRINDSTED™ LFS 560 is tested. Component (b) is a fully hardened palm oil with a dropping point of 60° C.

TABLE II

| Examples | 1-1 | 1-2 | 1-3 | 1-4 | 1-5 |
| --- | --- | --- | --- | --- | --- |
| 98 parts soy oil + 2 parts fully hardened palm oil | 80 | 70 | 60 | 50 | 40 |
| GRINDSTED ™ LFS 560 | 20 | 30 | 40 | 50 | 60 |

GRINDSTED™ LFS 560 (available from Danisco Ingredients, Denmark) is composed of pectin—E 440, sodium alginate E 401.

Processing

1. Melt and blend soy oil and fully hardened palm oil and tempering to 50–55° C.

2. Cool and crystallise the blend in a tube chiller e.g. Gerstenberg pilot plant 3×57 using 2 tubes, though put 50 kg/h, ammonia temperature 0 to −20° C., rotor speed 950 rpm, outlet temperature 0–20° C.

3. Let the blend rest for min 2 hours at room temperature, 15–25° C.

4. Agitate for 10–15 min using a propeller mixer e.g. IKA eurostar digital propeller mixer with a turbine stirrer Ø 50 mm or Ø 70 mm from 500–1500 rpm.

5. Add GRINDSTED™ LFS 560. Agitate for 2–5 min or until the particulate is fully distributed in the crystallised oil using the above mentioned turbine stirrer.

The blend were stored at 5° C. and 20° C. After 2 weeks storage at 20° C. and 5° C. the samples were evaluated with regard to oil separation, sedimentation and pourability.

After 2 weeks storage at 20° C. and at 5° C. all samples were pourable, stable without any oil separation and no sedimentation of the stabiliser was observed. However at the high levels of GRINDSTED™ LFS 560 (50–60%) the viscosity increases.

Example 2

Different Particle Sizes

The production process of example 1 was used to prepare the following compositions.

TABLE III

| Ingredients | 2-1 | 2-2 |
| --- | --- | --- |
| oil blend (comprising 98 parts rapeseed oil + 2 parts fully hardened rape seed oil) | 60% | 60% |

TABLE III-continued

| Ingredients | 2-1 | 2-2 |
|---|---|---|
| GRINDSTED ™ Alginate FD 175 sodium alginate, Particle size max. 2% > 100 μm | 40% | — |
| GRINDSTED ™ Alginate FD 125 sodium alginate, Particle size max. 2% > 620 μm | — | 40% |

GRINDSTED™ Alginate FD 175 is available from Danisco Ingredients, Denmark.

TABLE IV

Evaluation of pourability and sedimentation after two weeks storage

| Evaluation Temperature | 2-1 | 2-2 |
|---|---|---|
| 5° C. | Pourable, however viscosity higher than 2-2 No sedimentation | Pourable, No sedimentation |
| 20° C. | Pourable, however viscosity higher than 2-2 No sedimentation | Pourable No sedimentation |

A finer particle size of component (c) resulted in a higher viscosity of the composition.

Example 3
Crystal Modifiers;
Influence on the Viscosity of the Delivery System

TABLE V

| Ingredients | 3-1 | 3-2 | 3-3 |
|---|---|---|---|
| Soya lecithin | — | 0.2 | — |
| GRINDSTED ™ STS 30 | — | — | 0.5 |
| Oil blend (99 parts sunflower oil 1 part fully hardened palm oil) | 60% | 59.8% | 59.5% |
| GRINDSTED ™ LFS 560 | 40 | 40 | 40 |

GRINDSTED™ STS 30 and GRINDSTED™ LFS 560 are available from Danisco Ingredients, Denmark.

Processing
1. Melt and blend sunflower oil and fully hardened palm oil and tempering to 50–55° C.
2. Cool and crystallise the blend in a tube chiller e.g. Gerstenberg pilot plant 3×57 using 2 tubes, though put 50 kg/h, ammonia temperature 0 to −20° C., rotor speed 950 rpm, outlet temperature 0–20° C.
3. Let the blend rest for min. 2 hours at room temperature, 15–25° C. Cool the oil blend to 5° C. at slow agitation for 10–15 hours
4. Add GRINDSTED™ LFS 560. Agitate for 2–5 min or until the particulate is fully distributed in the crystallised oil using a propeller mixer e.g. IKA eurostar digital propeller mixer with a turbine stirrer Ø 50 mm or Ø 70 mm from 500–1500 rpm.

TABLE VI

Evaluation of pourability and sedimentation after two weeks storage

| Evaluation Temperature | 3-1 | 3-2 | 3-3 |
|---|---|---|---|
| 5° C. | Pourable, however viscosity higher than 3-2 and 3-3 No sedimentation | Pourable, No sedimentation | Pourable, No sedimentation |
| 20° C. | Pourable, however viscosity higher than 3-2 and 3-3 No sedimentation | Pourable No sedimentation | Pourable No sedimentation |

By visual evaluation the viscosity in samples 2-3 and 3-3 was lower than a liquid system where only fully hardened triglycerides were added (sample 3-1). All products were stable without oil separation or sedimentation of stabiliser.

Example 4
Effect of Storage Temperature on the Stability of Liquid Delivery System

TABLE VII

| Composition | 4-1 | 4-2 | 4-3 |
|---|---|---|---|
| Oil blend | 60% (99 parts sunflower oil, 1 part fully hardened palm oil) | 60% (99 parts sunflower oil, 1 part fully hardened palm oil, 1 part of partially hydrogenated soya oil (melting point 41° C.) | 60% (97 parts sunflower oil, 2 parts fully hardened palm oil, 1 part of partially hydrogenated soya oil (melting point 41° C.) |
| GRINDSTED ™ AlginateFD122* | 40 | 40 | 40 |

*available from Danisco Ingredients, Denmark

TABLE VIII

Effect of storage temperature on stability on composition after 2 weeks storage

| Sample | Oil separation at 20° C. | Oil separation at 25° C. | Oil separation at 30° C. | Oil separation at 35° C. |
|---|---|---|---|---|
| 4-1 | 0 | 0–2% | 5–10% | 10–20% |
| 4-2 | 0 | 0 | 0–5% | 5–10% |
| 4-3 | 0 | 0 | 0% | 0–2% |

If the liquid delivery systems are stored at higher temperature there is a clear tendency to higher oil separation indicating instability of the system. At higher storage temperature however the stability is improved by increased dosage of fully hardened fat.

Example 5
Different types of Ingredients Used in the Composition.

TABLE IX

| Composition | 5-1 | 5-2 | 5-3 | 5-4 |
|---|---|---|---|---|
| Soy oil 99 parts + 1 parts fully hardened palm oil | 80 | 67 | 99 | 60 |
| Vanillin in powder form | 20 | — | — | — |
| GRINDSTED ™ FF 1102 stabiliser* | — | 33 | — | — |

TABLE IX-continued

| Composition | 5-1 | 5-2 | 5-3 | 5-4 |
|---|---|---|---|---|
| GRINDAMYL ™ S 100 bakery enzyme* | — | — | 1 | — |
| GRINDSTED ™ LFS 560 stabiliser* | — | — | — | 40 |

*available from Danisco Ingredients, Denmark

Different types of components have been tested in dosages from 1–40%. All samples were stable without oil separation and no sedimentation of the powder was observed either at 5° C. or 20° C.

Example 6

Use of the composition Containing 20% Vanillin Flavouring in Pound Cakes

The composition mentioned in table IX, sample 5-1 was tested in pound cakes.

TABLE X

Pound cake formulation

| Ingredients | % |
|---|---|
| Sugar | 25 |
| Cake margarine | 24.9 |
| Egg | 25 |
| Wheat starch | 12.50 |
| Wheat flour | 12.00 |
| Baking Powder | 0.5 |
| Vanillin flavouring table 8 no 1 | 0.1 |

Procedure:
1. Bring all ingredients to room temperature and mix to a Hobart mixer N-50.
2. 1 min. at $1^{st}$ speed. Scrape down.
3. 1 min. at $2^{nd}$ speed. Scrape down.
4. 5 min at $3^{rd}$ speed.
5. Put the dough into a cake form.
6. Bake for 50 min at 180 c (hot air oven)

The pound cake table were evaluated in taste panel and compared with a pound cake were the same vanillin dissolved in ethanol was added in same dosage. The taste panel could not find any difference between the 2 cakes.

Example 7

Use of the Composition Low Fact Spread Production

The composition mentioned in Table II, sample 1-3 has been tested in low fat spread.

| Composition of low fat spread | | |
|---|---|---|
| Water phase: | Sample 1-3, table II | 3.75% |
| | Whey powder | 1.0% |
| | Salt | 1.2% |
| | K-sorbate | 0.1% |
| | Water | up to 62.25% |
| | pH | 5.5 |
| Fat phase: | DIMODAN ® TO* | 0.5% |
| | β-carotene | 4 ppm |
| | Fat blend | 37.25% |
| | 25 parts soya 41° C. | |
| | 75 parts liquid oil | |
| Flavourings: | GRINDSTED ™ Butter Flavouring 2873* to the fat phase | 0.01% |
| | GRINDSTED ™ Butter Flavouring 3507* to the water phase | 0.01% |

*available from Danisco Ingredients, Denmark

Process
1. Add sample 1-3 in 70–80° C. water, while agitating vigorously until the stabiliser is fully dissolved. Add the whey powder salt and K-sorbate. Cool water phase to approx. 40° C. Adjust pH. It may be necessary to pasteurise the water phase or emulsion.
2. Melt the fat blend and adjust the temperature to 40° C. Add the β carotene.
3. Heat the DIMODAN® OT with some of the oil in the ration of 1:5 to a temperature (60–65° C.) which is 5–10° C. higher than the melting point of the emulsifier. When this blend is completely melted and well stirred, add it to the remaining heated fat blend, stirring continuously.
4. Add the flavourings.
5. Make the emulsion by adding water phase slowly to the fat phase, stirring vigorously.
6. Crystallise and knead vigorously in a tube chiller e.g. Gestenbery & Agger Labo-Perfector 3×57 (20 kg/h ammonium −10° C. using 2 tubes. Product outlet temperature approx. 12–15° C.

The low fat spread were evaluated at 5° C. after 2 days for spreadability and instability (water separation) by spreading the low fat spread with a knife on cardboard.

The low fat spread were stable and smooth without water separation.

Example 8

Use of the Composition in 50% Oil Mayonnaise

TABLE XI

| | Cold Process | Hot Process |
|---|---|---|
| Phase 1 | | |
| Water | 34.35 | 32.85 |
| Salt | 1.00 | 1.00 |
| Sugar | 3.00 | 3.00 |
| Potassium Sorbate | 0.10 | 0.10 |
| Composition containing 67% of a blend of 99 parts soya oil and 1 part fully hardend palm oil and 33% GRINDSTED ™ FF 1102 | 6.00 | — |
| Composition containing 67% of a blend of 99 parts soya oil and 1 part fully hardend palm oil and 33% GRINDSTED ™ FF 1109 | — | 10.5 |
| Phase 2 | | |
| Liquid Egg Yolk | 4.00 | 4.00 |
| Phase 3 | | |
| Soya Oil | 46.00 | 44.00 |
| Phase 4 | | |
| Vinegar 10% | 4.00 | 4.00 |
| Mustard | 1.50 | 1.50 |
| GRINDSTED ™ Flavouring 3219* | 0.05 | 0.05 |
| Total | 100.00 | 100.00 |

*available from Danisco Ingredients, Denmark

GRINDSTED™ FF 1102 (available from Danisco Ingredients, Denmark) contains modified starch (E1412), guar gum (E412), xanthan gum (E415).

GRINDSTED™ FF 1109 (available from Danisco Ingredients, Denmark) contains starch, guar gum (E412), xanthan gum (E415).

TABLE XII

| Cold Process | Hot Process |
|---|---|
| 1. Mix water, salt, sugar and potassium sorbate | 1. Mix water, salt, sugar and potassium sorbate |
| 2. Add the delivery systems containing GRINDSTED ™ FF 1102 to the water phase | 2. Add the delivery system containing GRINDSTED ™ FF 1109 to the water phase |
| 3. Mix until all ingredients have been fully dissolved | 3. Mix until all ingredients have been fully dissolved |
| 4. Add phase 2 | 4. Heat to 85° C. and cool to 20° C. |
| 5. Emulsify the rest of the oil into the water phase continuously under vacuum | 5. Emulsify phase 3 into phase 2 |
| 6. Add phase 4 | 6. Mix phase 1 and 4 into the emulsion |
| 7. Pack | 7. Pack |

The 50% oil mayonnaise are produced on a Koruma mixer type DH V 60/10.

The 50% oil mayonnaise produced in cold and hot process had the enquired viscosity and creaminess.

Example 9
Using Different Fully Hardened Fat/Monoglycerides Different Dosage.

As component (b) combination of fully hardened fat and monoglyceride (DIMODAN® PV*) were used as crystal matrix for particulate powdered enzyme for the production of a liquid enzyme delivery system. The composition is shown is the table XIII.

The products were produced according to the procedure mentioned in example 1.

TABLE XIII

| Composition | 9-1 | 9-2 | 9-3 | 9-4 |
|---|---|---|---|---|
| Sunflower oil | 93 | 93 | 93 | 93 |
| Fully hardened palm oil | 2 | 1.8 | 1.5 | 1 |
| DIMODAN ® PV* | 0 | 0.2 | 0.5 | 1 |
| GRINDAMYL ™ 9201* | 5 | 5 | 5 | 5 |

*available from Danisco Ingredients, Denmark

Examples 9-1 to 9-4 were all stable without oil separation when stored at 20° C. When stored at 30° C. there was an increased tendency to oil separation with increased concentration of DIMODAN® PV.

Example 10
Different Processes of Preparation

Compositions a starch (component c) were produced according the following conditions.

Recipe

| GRINDSTED ™ FF1102* | 10% |
|---|---|
| Soya oil | 88% |
| GRINDSTED ™ PS 209* | 2% |

*available from Danisco Ingredients, Denmark

Process

1. Soya oil and GRINDSTED™ PS 209 were heated to 70° C. and the cooled to 60° C.
2. GRINDSTED™ FF1102 was added to fat blend while agitating on a propeller-mixer.
3. This mixture was processed on a one tube chiller Gerstenberg lab perfecter BGS 1×57. Capacity 40 kg/t cooling with water at 15° C. °. Product outlet approx. 19–22° C.
4. The product rested for 2 hours at room temperature (20–25° C.)
5. Mixed for 15 min on a propeller mixer
6. Tapped The product was stable, pourable and without oil separation after 4 weeks storage at 20° C.

The same recipe was produced with a different processing conditions as follows:

1. Soya oil and GRINDSTED™ PS 209 were heated to 70° C.
2. The blend were slowly cooled from 70 C to 20 C (15 hours) during slowly agitation with a propeller mixer.
3. Further cooled from 20 C to 5 C (10 hour) during slowly agitation with a propeller mixer.
4. GRINDSTED™ FF 1102 was added during mixing and the mixing continued until the particulate was completely distributed.

Using these processing conditions it was also possible to produce was stable and pourable product without oil separation after 4 weeks storage at 20° C.

Example 11
Processing for a Liquid Delivery System for Enzymes in Solid Form

TABLE XIV

| Sample | Component (a) | Component (b) | Component (c) | Observation |
|---|---|---|---|---|
| 11-1 | Soya oil 99% | fully hardened palm oil 1% | Enzyme powder GRINDAMYL ™ H 121* (Average particle size 100 μm) 1% | No sedimentation. No loss of activity after storage[i] |
| 11-2 | Soya oil 98% | fully hardened palm oil 2% | Enzyme powder GRINDAMYL ™ H 121* (Average particle size 100 μm) 10% | No sedimentation. No loss of activity after storage |
| 11-3 | Soya oil 100% | 0% | Enzyme powder GRINDAMYL ™ H 121* (Average particle size 150 μm) 10% | Sedimentation after a few minutes |
| 11-4 | Water 100% | 0% | Solubilised enzyme powder GRINDAMYL ™ H 121* + preservatives 10% | Loss of activity after 2 months[1] storage |

*available from Danisco Ingredients, Denmark

Samples 11-1, 11-2 and 11-3 were produced according to the procedure of Example 1.

11-2 vs. 11-3: The effect of fully hardened palm oil is the difference between 11-2 and 11-3. This is shown in FIG. 1.

The enzyme containing composition was kept at 30° C. for 2 month. (This is a typical storage condition at many factories during summer). Analyses of the enzyme activity showed that 11-2 had more than 90% activity left and 11-4 had less than 80% activity after 2 months storage.

The composition 11-2 was tested in Danish rolls according to the following procedure and compared to GRINDAMYL™ H 121 added as a powder Baking Tests Flour, Danish reform 1500 g, compressed yeast 90 g, sugar 24 g, salt 24 g. water 400 Brabender units+2% were kneaded in a Hobart mixer with hook for 2 mins. low speed and for 9 mins. at high speed. The dough temperature was 26° C. The dough was scaled 1350 g. resting 10 min at 30° C. and moulded on a Fortuna moulder. Proofing 45 min. at 34° C. Baking in a Bago-oven 18 min. at 220° C. and steam 12 sec. After cooling the rolls were scaled and the volume of the rolls was measured by the rape seed displacement method.

$$\text{Specific bread volume} = \frac{\text{Volume of the bread, ml}}{\text{Weight of bread, g}}$$

Results from the baking test is shown in Table XV

TABLE XV

| Test | Enzyme | Specific Bread Volume |
|---|---|---|
| 11-2a | 0% (control) | 5.75 |
| 11-2b | 0.1% of sample 11-2 | 7.25 |
| 11-2c | 0.01% of GRINDAMYL ™ H 121 | 7.15 |

Example 12
Composition Produced with Different Liquid Emulsifiers as Component (a)

TABLE XVI

| Component (a) | Component (b) | Component (c) | Component (d) |
|---|---|---|---|
| 1 80 parts Rape seed oil GRINDSTED ™ ACETEM 95 CO* | 2 parts fully hardened palm oil | 5 parts enzyme powder (150 μm) GRINDAMYL ™ H 121* | 1 part GRIND-STED ™ CITREM LR 10* |
| 2 75 parts PANADON ™ AB 100 23 parts GRINDSTED ™ ACETEM 95 CO* | 2 parts PANODAN ™ AM | 3 parts enzyme powder GRINDAMYL ™ H 121* (150 μm) | |
| 3 98 parts sunflower oil | 2 parts fully hardened rape seed oil | 10 parts enzyme powder, GRINDAMYL ™ 757*(200 μm) | 0.5 parts Soya Lecithin |
| 4 98 parts PANODAN ™ TR* | 1 part fully hardened rape seed oil | 2 parts enzyme powder GRINDAMYL ™ H 121* (150 μm) | |

*available from Danisco Ingredients, Denmark

All four examples were processed according to the procedure mentioned in example 1.

The products were all liquid and pumpable, and the enzyme was homogenous distributed in the product after 2 weeks storage at 20° C.

PROTOCOL A-SEDIMENTATION INDEX (S.I.)

1. 100 ml of composition was introduced into a vertical glass cylinder having a diameter of 2.8 cm.

2. The composition was allowed to stand for 7 days at a temperature of 5° C.

3. A first connecting glass piece was placed at a distance 20%±5% from the top level of the composition.

4. A second connecting glass piece was placed at a distance 80%±5% from the top level of the composition.

5. From each connecting piece a 5 ml sample of the composition was taken

6. The concentration of component (c) in each sample was determined. The concentration are $C_{top}$ and $C_{bottom}$, respectively.

7. The sedimentation index was calculated by the formula $$S.I. = \frac{\text{ABS}[C{bottom} - C{top}]}{(C{bottom} + C{top})/2} * 100$$

PROTOCOL B-SEPARATION INDEX (Sp.I.)

The separation index is determined by measuring $C_{top}$ and $C_{bottom}$ as described above and comparing the average of $C_{top}$ and $C_{bottom}$, with the theoretical concentration $C_{theoretical}$ of component (c).

$$Sp.I. = \frac{(C{bottom} + C{top})/2}{C{theoretical}} * 100$$

PROTOCOL C-SURFACE AREA

The particle size of crystals of component (b) can be determined using a Malvern Laser Particle Counter. With this information and the knowledge of the amount of component (b) in crystalline form present in the composition, one may calculate the minimum surface area of component (b) per gram of component (b).

Information on determination of average crystal size is also given in Annex 1.

Modifications of the present invention will be apparent to those skilled in the art.

What is claimed is:

1. A composition comprising:
    (a) an oil and/or an oil mimetic component;
    (b) an emulsifier having a dropping point of greater than 40° C.;
    (c) an enzyme;
        wherein the enzyme (c) is in a stable suspension within a crystal matrix formed by component (b);
    with the proviso that the enzyme (c) does not form a crystal matrix.

2. A composition comprising:
    (a) an oil and/or an oil mimetic component;
    (b) a triglyceride fatty acid and/or an emulsifier having a dropping point of greater than 40° C.;
    (c) an enzyme;
        wherein the enzyme (c) is in a stable suspension within a crystal matrix formed by component (b);
    with the proviso that the enzyme (c) does not form a crystal matrix, wherein component (b) is substantially not in β crystal form.

3. A composition comprising:
    (a) an oil and/or an oil mimetic component;
    (b) a triglyceride fatty acid and/or an emulsifier having a dropping point of greater than 40° C.;
    (c) an enzyme;
        wherein the enzyme (c) is in a stable suspension within a crystal matrix formed by component (b);
    with the proviso that the enzyme (c) does not form a crystal matrix, wherein component (b) is substantially in β' crystal form.

4. A composition comprising
    (a) a dispersant;
    (b) a crystal forming component;
    (c) an enzyme wherein component (b) is present in an amount of less than 2% based on the weight of the composition; and wherein component (c) is in a stable suspension within a crystal matrix formed by component (b); with the proviso that component (c) does not form a crystal matrix.

5. The composition of claim 4 wherein component (a) is an oil and/or an oil mimetic component.

6. The composition of claim 4 wherein component (a) is an oil mimetic component.

7. The composition of claim 1, 2, 3 or 4 wherein the oil mimetic component (a) is a low melting point emulsifier.

8. The composition of claim 1, 2, 3 or 4 wherein the crystal forming component (b) is a triglyceride fatty acid and/or a high melting point emulsifier component.

9. The composition of claim 8 wherein the triglyceride fatty acid is a fully hardened fat and/or partially hardened fat.

10. The composition of claim 1, 2, 3 or 4 wherein component (b) is a high melting point emulsifier.

11. The composition of claim 1, 2 or 4 wherein component (b) is substantially not in β crystal form.

12. The composition of claim 1, 2 or 4 wherein component (b) is substantially in β' crystal form.

13. The composition of claim 1, 2, 3 or 4 wherein component (c) was added in a form discrete from component (a) and component (b).

14. The composition of claim 1, 2, 3 or 4 wherein component (c) has an average size of greater than 50 μm.

15. The composition of claim 1, 2, 3 or 4 wherein the composition further comprises (d) a crystal modifier.

16. The composition of claim 1, 2, 3 or 4 wherein component (a) is in an amount of greater than 40% by weight of the composition.

17. The composition of claim 1, 2, 4 or 4 wherein component (c) is in an amount of less than 60% by weight of the composition.

18. The composition of claim 1, 2, 3 or 4 wherein the composition comprises substantially no water.

19. The composition of claim 1, 2, 3 or 4 wherein the composition is for use as or in the preparation of a foodstuff or feed.

20. A foodstuff comprising the composition of claim 1, 2, 3 or 4.

21. A bread improver comprising the composition of claim 1, 2, 3 or 4.

22. A composition comprising
(a) an oil mimetic component;
(b) a crystal forming component;
(c) an enzyme
wherein component (c) is in a stable suspension within a crystal matrix formed by component (b); with the proviso that component (c) does not form a crystal matrix.

23. The composition of claim 1, 2, 3 or 22 wherein the oil mimetic component (a) is a low melting point emulsifier.

24. The composition of claim 1, 2, 4 or 22 wherein the crystal forming component (b) is a triglyceride fatty acid and/or a high melting point emulsifier component.

25. The composition of claim 24 wherein the triglyceride fatty acid is a fully hardened fat and/or partially hardened fat.

26. The composition of claim 1, 2, 4 or 22 wherein component (b) is a high melting point emulsifier.

27. The composition of claim 22 wherein component (b) is substantially not in β crystal form.

28. The composition of claim 22 wherein component (b) is substantially in β' crystal form.

29. The composition of claim 22 wherein component (c) was added in a form discrete from component (a) and component (b).

30. The composition of claim 22 wherein component (c) has an average size of greater than 50 μm.

31. The composition of claim 22 wherein the composition further comprises (d) a crystal modifier.

32. The composition of claim 22 wherein component (a) is in an amount of greater than 40% by weight of the composition.

33. The composition of claim 1, 2, 3 or 22 wherein component (b) is in an amount of less than 40% by weight of the composition.

34. The composition of claim 22 component (c) is in an amount of less than 60% by weight of the composition.

35. The composition of claim 22 wherein the composition comprises substantially no water.

36. The composition of claim 22 wherein the composition is for use as or in the preparation of a foodstuff or feed.

37. A foodstuff comprising the composition of claim 22.

38. A bread improver comprising the composition of claim 22.

* * * * *